(12) United States Patent
Audette et al.

(10) Patent No.: US 6,847,013 B2
(45) Date of Patent: Jan. 25, 2005

(54) HEATED PROOFING CABINET

(75) Inventors: David M. Audette, Dover, DE (US); Robert Prochazka, Dover, DE (US)

(73) Assignees: Metal Masters Foodservice, Clayton, DE (US); Equipment Co., Inc., Clayton, DE (US)

( * ) Notice: Subject to any disclaimer, the term of this patent is extended or adjusted under 35 U.S.C. 154(b) by 0 days.

(21) Appl. No.: 10/364,174

(22) Filed: Feb. 10, 2003

(65) Prior Publication Data

US 2004/0155024 A1 Aug. 12, 2004

(51) Int. Cl.⁷ .......................... F24C 15/32; A61B 1/26; F27D 7/04
(52) U.S. Cl. .......................... 219/400; 99/476; 99/481; 126/21 A
(58) Field of Search ................................. 219/400, 401, 219/385, 386; 99/474–476, 480, 481, 483; 34/543, 546, 549, 553

(56) References Cited

U.S. PATENT DOCUMENTS

| | | | | | |
|---|---|---|---|---|---|
| 3,626,922 A | * | 12/1971 | Borge | ........................ | 126/21 A |
| 3,780,794 A | * | 12/1973 | Staub | ......................... | 219/400 |
| 4,109,636 A | * | 8/1978 | Burge | ........................ | 126/21 A |
| 4,924,072 A | * | 5/1990 | Oslin | ......................... | 219/401 |
| 6,294,762 B1 | * | 9/2001 | Faries et al. | ................ | 219/400 |
| 6,323,464 B1 | * | 11/2001 | Cohn | ......................... | 219/401 |

* cited by examiner

Primary Examiner—Joseph Pelham
(74) Attorney, Agent, or Firm—Connolly Bove Lodge & Hutz LLP

(57) ABSTRACT

A heated proofing cabinet with improved air flow and minimal air leakage comprises an enclosure having an interior space and an access door. A blower is positioned to supply forced air into the interior space of the enclosure and at least one heater is positioned to heat the air. A venturi air flow chamber has an entrance end connected to receive forced air from the blower and an exit end connected to deliver air to the interior space of the enclosure. A first air duct receives air from the exit end of the venturi air flow chamber and distributes the air to the interior space of the enclosure, and a second air duct receives air from the interior space of the enclosure and directs the air to the blower. Temperature and humidity levels within the interior space of the enclosure are controlled.

13 Claims, 4 Drawing Sheets

HEATED PROOFING CABINET

BACKGROUND OF THE INVENTION

The present invention relates to a heated proofing cabinet, and more particularly to a cabinet having improved air flow circulation for maintaining hot food products at desired temperature levels and for proofing dough products in a controlled environment.

Prior to the present invention cabinet constructions have been proposed for holding hot foods and maintaining those foods at desired temperature levels. Similarly, proofing cabinets have been developed for the placement of dough products in a temperature and humidity controlled environment. In cabinets of this type air flow circulation is an important factor in accomplishing desired results in an efficient and economical matter. Increased air flow often leads to air leakage, particularly around the door structures that access the cabinet, and air leakage has a negative affect on operation and costs.

SUMMARY OF THE INVENTION

Accordingly, it is an object of the present invention to provide a cabinet for holding and maintaining hot food products at desired temperature levels and also for proofing dough products where the cabinet has improved air circulation.

Another object of the present invention is the provision of a cabinet with efficient temperature and humidity regulation and improved air flow circulation within the cabinet.

Another object of the present invention is a heated cabinet for maintaining hot food products at desired temperature levels having high air flow characteristics with minimal air leakage from the cabinet.

Still another object of the present invention is proofing cabinet with temperature and humidity regulation and improved high air flow characteristics through the cabinet with minimal air leakage from the cabinet.

In accordance with the present invention, a heated proofing cabinet having improved air flow characteristics comprises an enclosure having an interior space and an access door. A blower is positioned to supply forced air into the interior space of the enclosure and at least one heater is positioned to heat the air. A venturi air flow chamber has an entrance end connected to receive forced air from the blower and an exit end connected to deliver air to the interior space of the enclosure. A first air duct receives air from the exit end of the venturi air flow chamber and distributes the air to the interior space of the enclosure, and a second air duct receives air from the interior space of the enclosure and directs the air to the blower.

Preferably, the first air duct is located on one side of the enclosure and the second air duct is located on the other side of the enclosure. Each of the air ducts has a plurality of openings facing the interior space of the enclosure. Preferably, the plurality of openings in the air ducts include a group of slotted openings at a lower end portion thereof with spaced apart smaller openings above the slotted openings extending to a top end portion of the ducts.

The first air duct on one side of the enclosure includes an entrance opening at the lower end thereof in communication with the exit end of the venturi air flow chamber for receiving air from the chamber. Similarly, the second air duct on the opposite side of the enclosure includes an exit opening at the lower end thereof in communication with the blower for directing air to the blower.

Preferably, the heater is positioned in the venturi air flow chamber downstream from the blower.

Additionally, the heated proofing cabinet includes a thermostat for sensing and controlling the temperature level of the air within the enclosure. Also, a humidistat may be provided for sensing and controlling the moisture level within the enclosure. A plurality of supports within the enclosure are constructed and arranged to hold product laden trays for heating and/or proofing the products.

BRIEF DESCRIPTION OF THE DRAWINGS

Novel features and advantages of the present invention in addition to those mentioned above will become apparent to persons of ordinary skill in the art from a reading of the following detailed description in conjunction with the accompanying drawings wherein similar reference characters refer to similar parts and in which:

FIG. 5 is an interior side elevational view of one of the two side air duct panels of the heated proofing cabinet of FIGS. 1–4, according to the present invention; and FIG. 6 is a top plan view of the side air duct panel of FIG. 5, according to the present invention.

DETAILED DESCRIPTION OF THE INVENTION

Figure 1:
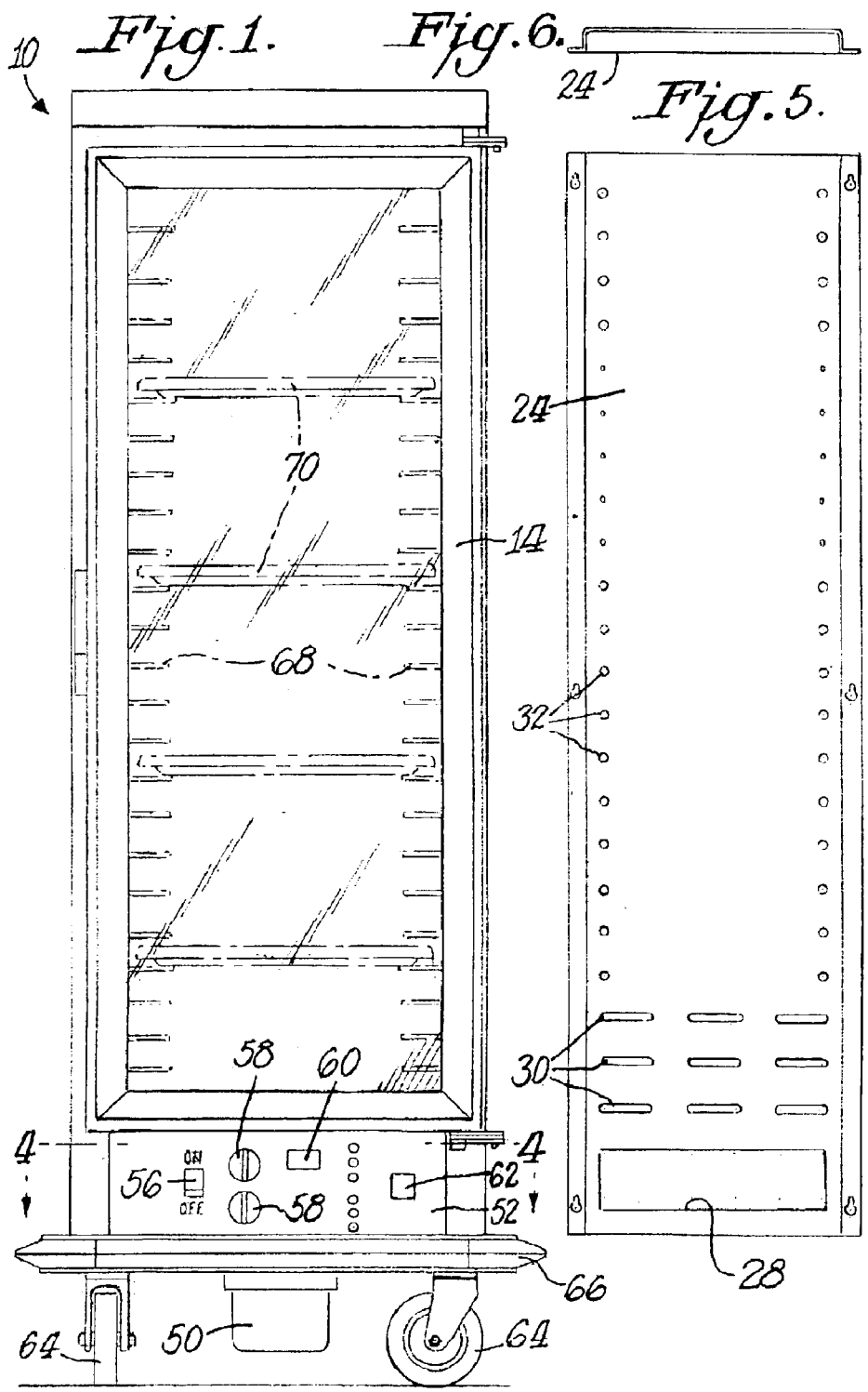
FIG. 1 is a front elevational view of a heated proofing cabinet with improved air flow circulation, according to the present invention.
Figure 2:
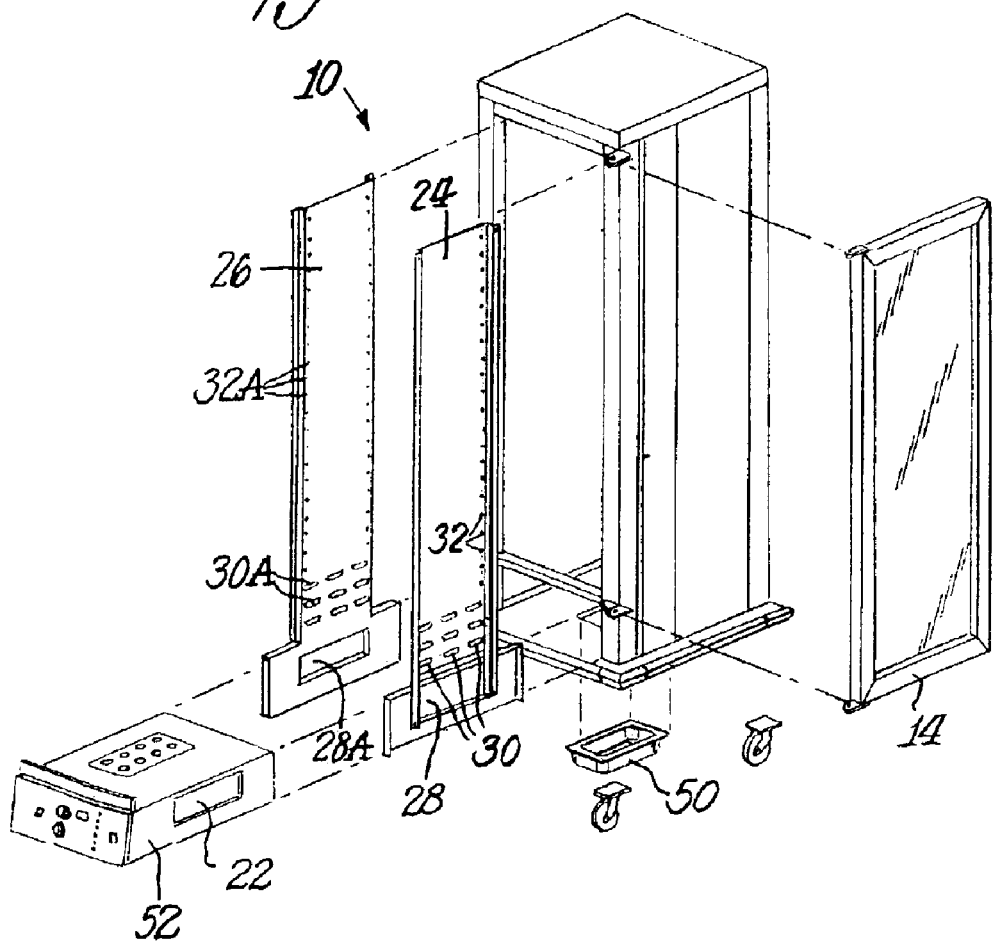
FIG. 2 is an exploded perspective view of the heated proofing cabinet of FIG. 1 showing the air flow assembly parts, according to the present invention.
Figure 3:
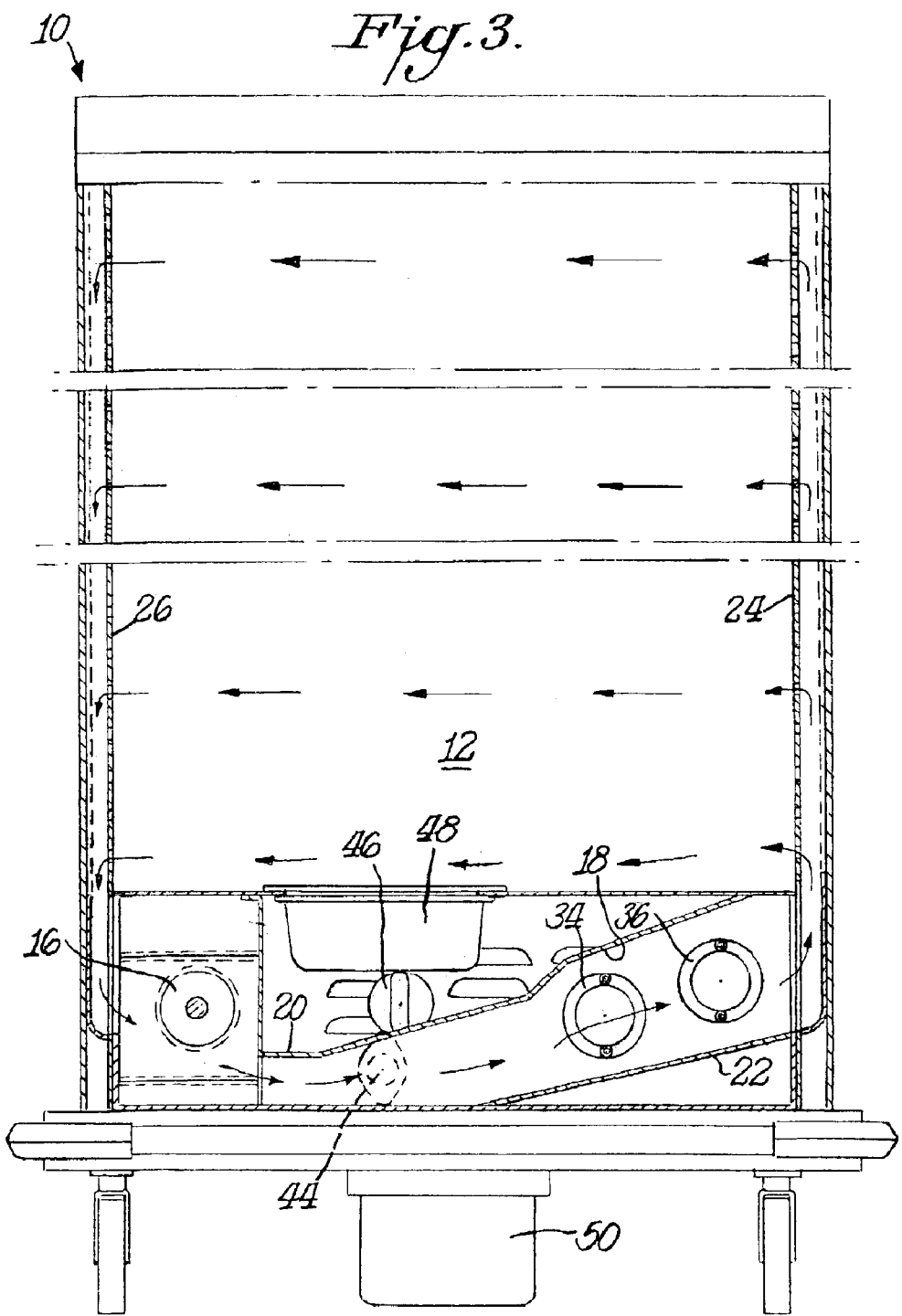
FIG. 3 is a transverse sectional view through proofing cabinet of FIGS. 1 and 2, according to the present invention.

Referring in more particularity to the drawings, FIGS. 1–3 illustrate a heated proofing cabinet 10 having improved air flow circulation and particularly useful for holding hot food products and proofing dough products. Fundamentally, the heated proofing cabinet 10 comprises an enclosure 12 having an interior space and an access door 14 at the front of the enclosure. A blower 16 at the base of the enclosure 12 is connected to supply forced air into the interior space of the enclosure. As shown best in FIG. 3, a venturi air flow chamber 18 has an entrance end 20 connected to receive forced air from the blower 16. The venturi air flow chamber 18 also has an exit end 22 connected to deliver air to the interior space of the enclosure 12.

As shown best in FIGS. 2, 3, 5 and 6, a first air duct 24 positioned on the right side of the enclosure 12 is connected to receive air from the exit end 22 of the venturi air flow chamber, and the air duct 24 distributes the air to the interior space of the enclosure. A similarly configured second air duct 26 is located on the left side of the enclosure 12 for receiving air from the interior space of the enclosure and directing air to the blower 16.

The first air duct 24 on the right side of the enclosure 12 has an opening 28 at the base thereof which is in direct communication with the exit end 22 of the venturi air flow chamber 18. Additionally, a plurality of openings above base opening 28 face the interior space of the enclosure, and air exits each of these openings into the interior of the enclosure. Such plurality of openings include a group of slotted openings 30 at a lower portion of the air duct 24 together with the smaller openings 32 above the slotted openings extending to a top end portion of the first air duct. As shown best in FIG. 5, the smaller openings 32 include large and small circular openings along the interior side of the air duct 24.

The second air duct 26 includes a similar layout of openings identified by similar reference characters, but with the suffix A. The opening 28A communicates with the intake of the blower 16 while the slotted openings 30A and the smaller openings 32A receive air from the interior space of the enclosure 12.

Figure 4:
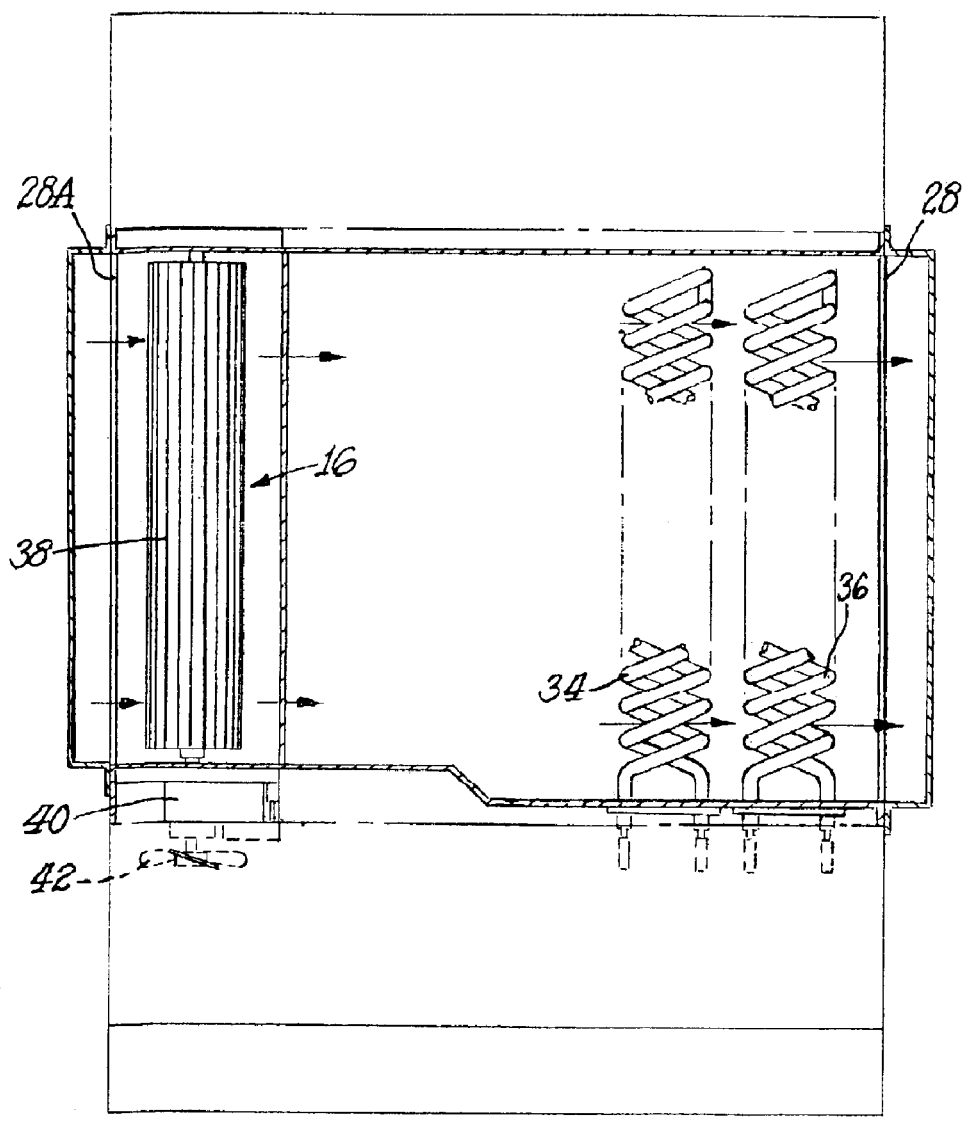
FIG. 4 is a cross-sectional view taken along line 4—4 of FIG. 1.

As shown best in FIGS. 3 and 4, heater elements 34, 36 are positioned within the venturi air flow chamber downstream from the blower. The heater elements may comprise twin 750 or 1000 watt heater elements. Also, as shown in FIG. 4, the blower 16 basically comprises a rotary unit 38 connected to a suitable motor 40 capable of producing a flow of about 250 CFM with an optional cooling fan 42 connected to maintain the motor at a desired temperature level.

The heater elements 34, 36 are connected to a suitable thermostatic control 44 for sensing, adjusting and controlling the temperature level of the air within the enclosure. Additionally, a humidistatic control 46 is provided for sensing, adjusting and controlling the moisture level of the air within the enclosure. Along with the humidistatic control 46 a humidifier/water pan 48 is positioned at the base of the enclosure and a drip pan 50 is mounted at the base of the cabinet 10 for collecting residual water within the enclosure.

Basically a power pack 52 houses the blower 16, venturi air flow chamber 18, thermostatic control 44 and humidistatic control 46. The front of the power pack 52 has an on/off switch 54 as well as knobs 56 and 58 for the heat and moisture levels. A temperature display 60 is also included as well as an indicator 62 for the heater elements 34, 36.

The heated proofing cabinet 10 is preferably mounted on casters 64 with a circumferential bumper 66 above the casters. Moreover, the access door 14 may be lexan, and tray supports 68 may be positioned within the enclosure 12 for holding product laden trays 70.

As noted above, the heated proofing cabinet 10 of the present invention has improved air flow circulation where heated air flows through the enclosure without any significant leakage around the access door. In the embodiment illustrated in the drawings, the air circulates in a counter-clockwise direction through the enclosure 12. The venturi air flow chamber produces reduced pressure as the air passes therethrough which creates increase air flow velocity without excessive positive pressure within the enclosure which might otherwise cause the access door to inadvertently open. The venturi arrangement allows for significantly high air flow circulation without any undesirable effects such as leakage.

When dough products are placed within the heated proofing cabinet 10, the temperature and moisture levels are controlled so that the proofing process is extremely effective and efficient. Also, when hot food products are placed within the enclosure the air flow circulation maintains these products at desired temperature and moisture levels in a highly effective and efficient manner.

We claim:

1. A heated proofing cabinet having improved air flow circulation comprising an enclosure having an interior space and an access door, a blower for supplying forced air into the interior space of the enclosure, a venturi air flow chamber having an entrance end directly adjacent to the blower connected to receive forced air from the blower and an exit end connected to deliver air to the interior space of the enclosure, at least one heater connected to heat the air, a first air duct for receiving air from the exit end of the venturi air flow chamber and distributing the air to the interior space of the enclosure, and a second air duct for receiving air from the interior space of the enclosure and directing air to the blower.

2. A heated proofing cabinet as in claim 1 wherein the first air duct is located on one side of the enclosure and the second air duct is located on the other side of the enclosure, each of the air ducts having a plurality of openings facing the interior space of the enclosure.

3. A heated proofing cabinet having improved air flow circulation comprising an enclosure having an interior space and an access door, a blower for supplying forced air into the interior space of the enclosure, a venturi air flow chamber having an entrance end connected to receive forced air from the blower and an exit end connected to deliver air to the interior space of the enclosure, at least one heater connected to heat the air, a first air duct for receiving air from the exit end of the venturi air flow chamber and distributing the air to the interior space of the enclosure, and a second air duct for receiving air from the interior space of the enclosure and directing air to the blower, and wherein the first air duct is located on one side of the enclosure and the second air duct is located on the other side of the enclosure, each of the air ducts having a plurality of openings facing the interior space of the enclosure, and wherein the plurality of openings in the air ducts include a group of slotted openings at a lower end portion thereof with spaced apart smaller openings above the slotted openings extending to the top end portion of the ducts.

4. A heated proofing cabinet as in claim 1 wherein the first air duct includes an entrance opening at the lower end thereof in communication with the exit end of the venturi air flow chamber for receiving air from the chamber, and wherein the second air duct includes an exit opening at the lower end thereof in communication with the blower for directing air to the blower.

5. A heated proofing cabinet as in claim 1 wherein the heaters are positioned in the venturi air flow chamber downstream from the blower.

6. A heated proofing cabinet as in claim 1 including a thermostat for sensing and controlling the temperature level of the air within the enclosure.

7. A heated proofing cabinet as in claim 1 including a humidistat for sensing and controlling the moisture level of the air within the enclosure.

8. A heated proofing cabinet as in claim 1 including a plurality of supports within the enclosure for holding product laden trays.

9. A heated proofing cabinet as in claim 3 wherein the first air duct includes an entrance opening at the lower end thereof in communication with the exit end of the venturi air flow chamber for receiving air from the chamber, and wherein the second air duct includes an exit opening at the lower end thereof in communication with the blower for directing air to the blower.

10. A heated proofing cabinet as in claim 3 wherein the heaters are positioned in the venturi air flow chamber downstream from the blower.

11. A heated proofing cabinet as in claim 3 including a thermostat for sensing and controlling the temperature level of the air within the enclosure.

12. A heated proofing cabinet as in claim 3 including a humidistat for sensing and controlling the moisture level of the air within the enclosure.

13. A heated proofing cabinet as in claim 3 including a plurality of supports within the enclosure for holding product laden trays.

* * * * *

UNITED STATES PATENT AND TRADEMARK OFFICE
CERTIFICATE OF CORRECTION

PATENT NO. : 6,847,013 B2
DATED : January 25, 2005
INVENTOR(S) : David M. Audette et al.

It is certified that error appears in the above-identified patent and that said Letters Patent is hereby corrected as shown below:

Title page,
Item [75], Inventors, "Robert Prochazka, Dover, DE (US)" should read -- Robert J. Prochazka, Newark, DE (US) --.
Item [73], Assignee, "Metal Masters Food Service, Clayton DE (US); Equipment Co., Inc., Clayton DE (US)" should read -- Metal Masters Food Service Equipment Co., Inc., Clayton DE (US) --.

Signed and Sealed this

Twenty-eighth Day of June, 2005

JON W. DUDAS
*Director of the United States Patent and Trademark Office*